United States Patent [19]

Eguchi et al.

[11] Patent Number: 4,699,793

[45] Date of Patent: Oct. 13, 1987

[54] METHOD OF PRODUCING A SEASONING FROM CHEESE WHEY

[75] Inventors: Hajime Eguchi; Jiro Kataoka; Masahiro Takahashi, all of Kawasaki, Japan

[73] Assignee: Ajinomoto Co., Inc., Tokyo, Japan

[21] Appl. No.: 906,193

[22] Filed: Sep. 11, 1986

[30] Foreign Application Priority Data

Sep. 17, 1985 [JP] Japan .................................. 60-204790

[51] Int. Cl.⁴ ........................ A23C 21/02; A23L 1/221
[52] U.S. Cl. ........................................ 426/41; 426/72; 426/650; 426/638; 426/583
[58] Field of Search ...................... 426/583, 34, 42, 41, 426/61, 63, 73-74, 650, 652, 638, 580

[56] References Cited

U.S. PATENT DOCUMENTS 3,720,517  3/1973  Hamilton et al. ................... 426/583
3,930,039  12/1975  Kuipers ................................. 426/41

FOREIGN PATENT DOCUMENTS 0990571  6/1976  Canada .................................. 426/41

Primary Examiner—Raymond N. Jones
Assistant Examiner—Marianne M. Cintins
Attorney, Agent, or Firm—Oblon, Fisher, Spivak, McClelland & Maier

[57] ABSTRACT

A method for producing a seasoning from whey is disclosed wherein lactic acid bacteria are inoculated into whey and cultured at a temperature of 30°–50° C. while adjusting the pH to from 6–7. The fermented solution is centrifuged to produce a precipitate phase which contains proteins and a supernatant phase which contains alkali salts of lactic acid. The proteins are decomposed with a mineral acid or a proteolytic enzyme to produce a Seasoning Liquid A. The supernatant phase is neutralized and concentrated to produce a Seasoning Liquid B, and admixed with Seasoning Liquid A.

10 Claims, No Drawings

METHOD OF PRODUCING A SEASONING FROM CHEESE WHEY

BACKGROUND OF THE INVENTION

1. Field of the Invention

The present invention relates to a method of producing a liquid seasoning. In particular, it relates to a method of producing a novel, high quality liquid seasoning from cheese whey (hereinafter referred to as whey). Whey is produced in large quantities in the production of cheese all over the world and has not been fully utilized.

2. Discussion of the Background

The amount of cheese produced in the world is far greater than 10 million tons per year. In the production of cheese, nearly 90 million tons of whey is produced. However, techniques for utilizing whey have not been well developed. In the United States, where cheese is produced on a comparatively large scale, nearly half of the whey produced is considered a waste product requiring treatment at a considerable cost in order to prevent the pollution of water.

Even in the United States in which cheese is produced in factories on a relatively large scale, and hence the whey can be processed economically, only about 1.4 million tons (as solids) of whey is processed commercially. This is less than 50% of the total amount of whey produced from cheese factories.

Moreover, 75% of the processing is a simple condensation or drying, and 14% of the processing is the conversion of whey into lactose according to traditional processes, wherein proteins contained in whey are precipitated and removed, and the remaining liquid is merely subjected to a condensation or drying.

Whey is also processed into a whey protein concentrate (hereinafter referred to as WPC), employing the technology of ultrafiltration. This is applied to only 9% of the commercially processed whey, however.

As described above, the primary reason why techniques for utilizing whey have not been well developed lies in the fact that whey is of limited value when utilized for food. To be more specific, the use of whey is limited only to excipients, etc., in the food industry. In reality, even the use of WPC, which is processed to a relatively high extent, does not go beyond a substitute for skim milk. From a technical point of view, the solids content of whey is quite low, i.e., only 6.5% on the average. The solids content of whey consists of 70% by weight lactose, 10% by weight proteins and 20% by weight inorganic salts. Of these components, proteins are not heat stable and, once thermally denatured, become insoluble in water or a solution of salts, which reduces the utility value of the whey.

As described above, organic salts are present in whey in relatively large quantities. Among the salts contained in whey are cations, such as potassium, sodium, calcium and magnesium ions; and anions, such as chloride and phosphate ions. Because of the presence of large quantities of inorganic salts, whey has to be subjected to a desalting procedure before being utilized, which further decreases the utility value of whey.

In the production of WPC, proteins are condensed without being denatured by means of ultrafiltration, thus making it possible to solve the above-described disadvantages of whey. However, a need remains for a method of utilizing lactose and the inorganic salt fractions produced as by-products. This also restricts the production of WPC. There exists a substantial need to develop new techniques for utilizing whey. The present invention is directed to a new method for utilizing whey.

SUMMARY OF THE INVENTION

Accordingly, one object of the present invention is to provide a novel method for processing whey.

A further object of the invention is to provide a method of producing liquid and solid seasonings from whey.

Still another object of the invention is to provide tasty solid and liquid seasonings from whey.

These objects and other objects of the invention which will become apparent from the following specification have been achieved by the present method.

In the first step, yeast extract, lactulose, L-cysteine hydrochloride and skim milk (multiplication factors for lactic acid bacteria) are added to, and dissolved in whey generated in the production of cheese, or a slightly condensed whey, and the pH of the solution is adjusted to a range from 6 to 7. The resulting solution is then subjected to heating, so as to sterilize the solution, and at the same time, to denature, coagulate and precipitate whey proteins which are susceptible to heat. The resulting mixture is used as a culture medium for lactic acid bacteria in the next step.

Lactic acid bacteria are then inoculated in the culture medium and subjected to stationary culturing at a temperature of from 30° to 50° C. The pH of the culture medium is adjusted to around 6 to 7 by the addition of an alkaline solution since the pH value decreases with the multiplication of the lactic acid bacteria. The fermentation is continued until almost all the lactose contained in the culture medium has been converted into an alkali salt of lactic acid.

The thus fermented solution is then subjected to centrifugation with or without heating, so as to separate it into a precipitate phase consisting mainly of thermally denatured whey proteins and a supernatant phase, whose major components are alkali salts of lactic acid.

The precipitates are then decomposed with a mineral acid or a proteolytic enzyme into amino acids and peptides and, where necessary, deacidified or desalted. The decomposed solution is then neutralized and, where necessary, condensed to give Seasoning Liquid A.

The supernatent is also neutralized and then subjected to a condensation treatment to prepare Seasoning Liquid B.

The neutralization treatment of Seasoning Liquid A may be effected before or after admixing with Seasoning Liquid B. In a similar manner, the neutralization treatment of Seasoning Liquid B may be effected before or after admixing with Seasoning Liquid A.

In a preferred embodiment, Seasoning Liquids A and B are admixed at a solids ratio of from 5:95 to 95:5, to form an excellent seasoning liquid.

DETAILED DESCRIPTION OF THE PREFERRED EMBODIMENTS

The raw material to be used in the present invention is whey discharged from the production of cheese. Examples of whey usable in the present invention include sweet-type whey discharged from the rennet coagulation of casein and acid-type whey discharged from the lactic acid fermentation of casein. In general, the former is discharged in an amount of about 9 Kg per Kg of cheese produced, and has an average solids content of 6.5% (wt/wt). In general, its pH is not lower than 5.8. The latter is discharged in an amount of about 6 Kg per Kg of cottage cheese produced, and has an average solids content of 6.5% (wt/wt). Its pH is generally not higher than 5.2. The solids contained in whey comprise, on the average, 70% by weight lactose, 10% by weight proteins and 20% by weight inorganic salts.

In the first step of the method according to the present invention, the raw material, or whey, may be used as it is, or it may be used after being condensed to give a solid concentration of about 10% by weight. When the concentration of the solids is higher than 10%, the multiplication of lactic acid bacteria may be inhibited because of an undesirably high concentration of inorganic salts.

To this whey liquid are added multiplication factors for lactic acid bacteria, i.e., vitamins, yeast extract (amino acid source) and skim milk, as well as lactulose (sugar source). L-cysteine hydrochloride is also added to the whey liquid for the purpose of maintaining the culture medium in a reductive state during the multiplication of lactic acid bacteria. Yeast extract, skim milk and lactulose are added in a range of from 0.1 to 2% by weight, respectively. In ordinary cases, the additives are used in an amount of 0.5% by weight, each. L-cysteine hydrochloride is added in a range of from 0.01 to 0.1% by weight. In usual cases, L-cysteine hydrochloride is used in an amount of 0.05% by weight.

Thereafter, a dilute alkaline solution is added to the solution, and its pH is adjusted to 6 to 7, preferably to 6.5. The resulting solution is charged into a fermentation tank and then sterilized by means of heating, e.g., at a temperature of 120° C. for a period of 20 minutes.

The thus prepared culture medium is characterized in that proteins contained in whey, such as lactoalbumin and lactoglobulin, are thermally coagulated and precipitated. This is a very important feature of the invention since, as will be explained in detail in connection with the third step, it contributes to markedly reducing the generation of humus in the acid decomposition of the proteins and to lightening the coloring of the resulting amino acid solution.

Lactic acid bacteria are inoculated into the medium prepared as described above to carry out a lactic acid fermentation. Any type of lactic acid bacteria can be used in the method according to the invention, irrespective of the genus and species thereof. In the examples described below "streptococcus lactis 527" and "streptococcus thermophilus 510" are employed and are available from Nippon Nyugyo Kyokai. The inoculation of lactic acid bacteria into the culture medium is usually accomplished by using lactic acid bacteria cultured in a seed medium on a small scale.

A seed medium is usually prepared by dissolving or suspending, in water, 10% by weight skim milk, 1% by weight yeast extract, 1% by weight malt extract, 1% by weight lactulose and 0.1% by weight L-cysteine hydrochloride; adjusting the pH to 6–7, preferably to 6.5; and then sterilizing the resulting suspension in a autoclave at a temperature of 120° C. for a period of 10 minutes.

Seed culturing is usually carried out by inoculating freeze-stored lactic acid bacteria into the seed medium and then subjecting it to stationary culturing at a temperature of from 30° to 50° C. for a period of 24 hours.

The seed culture is then inoculated in a culture medium identical to the one prepared above in an amount of from 1 to 10% (v/v).

Thereafter, the medium is allowed to stand at a temperature of 30° to 50° C. to affect the main culturing. The pH of the culture solution is adjusted to 6–7, preferably from 6.0 to 6.5 by the addition of an alkaline solution since the pH value decreases along with the multiplication of lactic acid bacteria. The fermentation is continued until almost all the lactose has been converted into an alkali salt of lactic acid.

Examples of alkaline solutions usable for the pH adjustment include aqueous solutions of sodium hydroxide, potassium hydroxide, calcium hydroxide and magnesium hydroxide, as well as aqueous ammonia. These alkaline solutions may be used either alone or in combination. The alkalis combine with lactic acid to form an alkali salt thereof. Since the taste of lactate salts varies depending on the kind of alkali used, the alkaline solutions are usually used in the form of a mixture which results in good taste characteristics. For example, good taste characteristics can be attained by the use of a mixture of hydroxides comprising 10 to 30 parts by weight of potassium (K), 1 to 10 parts by weight of calcium (Ca), 1 to 5 parts by weight of magnesium (Mg) and 1 to 10 parts by weight of ammonium ($NH_4$), per part by weight of sodium (Na).

The fermentation is conducted in a manner as described above until almost all the lactose contained in the culture solution has been converted into alkali salts of lactic acid. It is sufficient to continue the fermentation for about 96 hours.

The second step of the invention is a step wherein the fermented solution prepared in the previous step is subjected—if necessary, after being heated to sterilize and precipitate the lactic acid bacteria—to centrifugation to separate it into a precipitate phase consisting mainly of thermally denatured proteins and a supernatant phase consisting mainly of alkali salts of lactic acid.

The third step of the invention is a step wherein the precipitates separated in the previous step are mixed with a mineral acid, e.g., hydrochloric acid, and then subjected to heating in order to decompose the proteins into amino acids and peptides, or a step wherein the precipitates are decomposed by a proteolytic enzyme into amino acids and peptides. The precipitates contain from 65 to 80% by weight of water. In the acid decomposition, hydrochloric acid is usually used in such an amount that the molar ratio of chlorine to nitrogen (Cl/N) is 1.5. The decomposition is usually conducted at a temperature of 106° C. for a period of 20 hours.

The decomposed liquid obtained by the above decomposition contains almost no humus and is light amber in color. This is highly preferred as a seasoning liquid. In addition to this, a liquid free from the decomposition odor (so-called HVP odor) characteristic of decomposed products of proteins can be obtained after the hydrochloric acid contained in the decomposed liquid has been removed by vacuum evaporation and the resulting liquid has been neutralized with an alkali, e.g., sodium hydroxide. This is also a preferred seasoning liquid. These are outstanding features of the present invention.

The decomposed liquid has an excellent taste since it contains large quantities of tasty amino acids, in particular, glutamic acid, proline and methionine. This is another important feature of the present invention.

In the second step, the decomposition of the proteins contained in the precipitate phase can be affected by use of a proteolytic enzyme, instead of a mineral acid. Any conventional protease can be used for the decomposition. The scope of the present invention is not restricted by the kind of enzyme used and conditions of the decomposition.

Seasoning Liquid A is produced in this step in accordance with the procedure described above, if necessary, with an additional concentration step.

Seasoning Liquid A is then admixed with Seasoning Liquid B. Seasoning Liquid B is prepared by neutralizing the supernatant of the fermented product, if necessary, by the addition of a dilute alkaline solution and then subjecting the resulting product to concentration, preferably to a volume of about 1/10.

Although the neutralization of Seasoning Liquids A and B can be conducted separately as described above, it is also possible to neutralize them after they are admixed.

Seasoning Liquids A and B are admixed at a solids content ratio of from 5:95 to 95:5.

The thus prepared liquid seasoning, as well as a solid seasoning prepared by the drying thereof, is free from unpleasant decomposition odor and is of an amber color. In addition, it is thick and tasty.

The high quality seasoning can be used as a table seasoning for a wide variety of dishes, like sauces and soy sauce. It is, therefore, highly valuable. The method according to the present invention is a unique and highly valuable technique for utilizing whey.

Other features of the invention will become apparent in the course of the following descriptions of exemplary embodiments which are given for illustration of the invention and are not intended to be limited thereof.

EXAMPLES

Example 1

In this example, 4.8 liters of acid-type whey (pH=4.2) comprising 6 g/dl of solids consisting of 70% by weight lactose, 10% by weight proteins and 20% by weight inorganic salts was used as a raw material.

To the whey were added 24.0 g powdered baker's yeast extract, 24.0 g lactulose (trade name "Uermi" by Nikken Kagaku Co., Ltd.), 2.4 g L-cysteine hydrochloride and 24.0 g skim milk (maufactured by Diffco. Co.). After they had been dissolved, the pH of the resulting solution was adjusted to 6.5 by the addition of 3N sodium hydroxide solution.

Thereafter, 800 ml each of the resulting solution was charged into six hot-air sterilized 1 liter conical flasks. The flasks were sterilized in an autoclave at a temperature of 120° C. for a period of 20 minutes, to prepare the main culture media. By this thermal sterilization, all the proteins contained in the whey were insolublized and precipitated at the bottom of the flasks.

A seed medium was prepared as follows: 8 g yeast extract (manufactured by Diffco Co.), 8 g malt extract (manufactured by Diffco Co.), 8 g lactulose, 0.8 g L-cysteine hydrochloride and 80 g skim milk were added to, and dissolved in, 800 ml of water. The pH of the resulting solution was adjusted to 6.5 with a dilute sodium hydroxide solution. The resulting mixture was placed in a 1 liter conical flask and sterilized in an autoclave at a temperature of 120° C. for a period of 10 minutes.

"*Streptococcus thermophilus* 510" marketed by Nippon Nyugyo Gijutu Kyokai was cultured in a culture medium having the same composition as the above seed medium at a temperature of 50° C. for a period of 24 hours, so that the number of lactic acid bacteria would exceed $10^9$/ml. The pH of the culture medium was adjusted to 6.5 with a dilute sodium hydroxide solution. The thus obtained cultured product was freeze-stored at $-40°$ C., and melted just before its actual use.

The seed was inoculated into the seed medium prepared above, and subjected to stationary culturing at a temperature of 50° C. for a period of 24 hours.

After the seed culturing had been completed, 50 ml each of the resulting product was charged into the 6 flasks containing the main culture media. The flasks were allowed to stand at a temperature of 50° C., to carry out main culturing.

A mixed alkaline solution employed to adjust the pH of the culture medium, which becomes acidic because of the conversion of lactose into lactic acid resulting from the multiplication of lactic acid bacteria, was prepared in the following manner: 5N solutions of sodium hydroxide, potassium hydroxide, calcium hydroxide, magnesium hydroxide and ammonium hydroxide were prepared separately, and then these alkaline solutions were admixed in such a ratio that the resulting mixture contained 20 parts by weight potassium (K), 3 parts by weight calcium (Ca), 2 parts by weight magnesium (Mg) and 5 parts by weight ammonium ($NH_4$), per part by weight of sodium (Na).

In the above-described main culturing, the pH of the culture medium, which was 6.2 at the time culturing was started, decreased to 3.2 after 24 hours. The mixed alkaline solution was added to the culture medium to adjust its pH to 6.5 (determined by pH test paper) and the culturing was continued. When the culturing was continued for additional 24 hours, the pH of the culture medium again decreased to 3.2. It was, therefore, readjusted to 6.5 by the addition of the mixed alkaline solution. After 24 hours of additional culturing, the pH of the culture medium had again decreased to 3.2, and it was readjusted to 6.5 by the addition of the mixed alkaline solution. The culturing was continued for additional 24 hours, thus making the total fermentation time 96 hours.

The pH of the thus fermented solution was 5.0. This marks the end of the first step.

The fermented solutions in the 6 flasks were combined, and the combined solution was subjected to centrifugation, to separate it into 122 g of precipitate phase and 5,090 g of supernatent (second step). The thus separated precipitate phase contained 75% water.

To the precipitate was added sufficient concentrated hydrochloric acid so that the molar ratio of chlorine to nitrogen (Cl/N) contained therein became 1.5. The resulting mixture was placed in a flask and heated under reflux at a temperature of 106° C. for a period of 20 hours, to decompose the proteins.

The thus decomposed solution contained virtually no black humus. In addition, the solution was of amber color. It is, therefore, highly advantageous as an amino acid solution for use as a seasoning, compared with those obtained by the acid decomposition of extracted soybean flakes, which always contain black humus and are dark brown in color.

Thereafter, the hydrochloric acid contained in the decomposed solution was removed by vacuum evaporation, and the pH of the solution was adjusted to 5.2 by the addition of sodium hydroxide, to give Seasoning Liquid A. The thus prepared Seasoning Liquid A was free from the displeasing odor (so-called HVP odor) characteristic of amino acids prepared by decomposition. In this respect, too, it is highly preferable as an amino acid solution for use as a seasoning.

The amino acid content of Seasoning Liquid A was determined, and gave the following results in which the figures in parentheses show the amount of amino acids based on nitrogen (mg/N): glutamic acid (1,172), leucine (634), aspartic acid (613), lysine (516), proline (495), valine (333), serine (323), phenylalanine (312), isoleucine (301), tyrosine (301), threonine (290), alanine (280), arginine (280), histidine (161), glycine (161), methionine (151) and cystine (65). In this seasoning liquid, glutamic acid, proline and methionine are present in significantly larger quantities, compared with acid decomposition solutions prepared from extracted soybean flakes. This contributes to the highly desirable taste of Seasoning Liquid A.

The supernatent obtained in the previous step (5,090 g, pH=5.0) was concentrated by evaporation to a volume of about 1/10, to give Seasoning Liquid B. This liquid contained 50% by weight water and 23.8% by weight lactic acid. It also contained remaining saccharides as follows: lactose (0.19% by weight), fructose (1.48%), maltose (0.19%) and galactose (1.50%).

The thus prepared Seasoning Liquids A and B were admixed at three different ratios to give three seasoning liquids, the ratio of the amount of solids contained in Seasoning Liquid A to that in Seasoning Liquid B (A/B) being 15, 5 and 0.5, respectively (third step).

The thus prepared liquid seasonings were poured onto small plates. Slices of "Sashimi" (raw meat) of tuna were dipped in the liquid seasonings and tasted. Results obtained are shown in the table set forth below. It should be understood that the liquid seasonings obtained in this example are excellent as a seasonings.

TABLE

| Results of Taste Test | |
|---|---|
| Ratio of Mixed Solids (A/B) | Taste of "Sashimi" of Tuna |
| 15 | Quite delicious and the taste characteristic of tuna was more enhanced than in the cases where ordinary soy sauces were used. |
| 5 | Most delicious and the taste characteristic of tuna was more enhanced than in the cases where ordinary soy sauces were used. |
| 0.5 | Quite delicious and the taste characteristic of tuna was more enhanced than in the cases where ordinary soy sauces were used. |

EXAMPLE 2

In this example, 100 liters of the same acidic whey as used in Example 1 was used as raw material.

To the raw material were added 1 kg liquid yeast extract having a solids content of 50% by weight, 500 g skim milk, 50 g lactulose, 50 g L-cysteine hydrochloride and 500 g powdered malt extract. After the additives had been dissolved, the pH of the resulting solution was adjusted to 6.5 by adding 240 g calcium hydroxide.

Thereafter, 50 liters each, of the resulting solution were placed in two flat bottomed round containers equipped with stainless steel lids, and preheated to a temperature of 80° C., by use of immersion heaters. They were then placed in an autoclave and sterilized under elevated pressure at a temperature of 110° C. for a period of 10 minutes, to prepare two main culture media. As a result of the thermal sterilization, almost all the proteins contained in the whey were insolubilized and precipitated at the bottom of the containers. One of the culture media was subjected to centrifugation. By this operation, 800 g (dried weight) of precipitated proteins were removed and 47 liters of supernatent was obtained. The supernatent was returned to the container provided with a stainless steel lid, and again sterilized in an autoclave at a temperature of 110° C. for a period of 10 minutes, to prepare a culture medium containing no whey proteins.

A seed medium was prepared by adding 500 g skim milk, 50 g malt extract powder, 100 g liquid yeast extract identical with the one used for the main culture medium, 20 g lactulose and 5 g L-cysteine hydrochloride to 5 liters of tap water, and the pH of the resulting solution was adjusting to 6.5 by the addition of a concentrated sodium hydroxide solution.

Thereafter, 1 liter each, of the thus prepared seed media was placed in five hot-air sterilized 2 liter conical flasks provided with cotton plugs. The flasks were sterilized in an autoclave at a temperature of 110° C. for a period of 10 minutes.

The same lactic acid bacteria as used in Example 1 were cultured in a medium having the same composition as that of the above seed medium, at a temperature of 48° C. for a period of 24 hours, whereby the number of the bacteria exceeded $10^9$/ml. The resulting cultured medium was inoculated in the flasks, in an amount of 20 ml per flask, and the flasks were allowed to stand at a temperature of 48° C. for a period of 24 hours, to conduct seed culturing.

Half of the thus prepared seed solution was added to the main culture medium containing precipitated proteins, and the rest of the cultured seed solution was added to the main culture medium containing no precipitated proteins. Both were allowed to stand at 48° C., to conduct main culturing.

The lactic acid bacteria seeded into the culture medium containing precipitated proteins multiplied during the culturing, whereas the lactic acid bacteria seeded into the medium containing no precipitated proteins did not multiple at all in that medium. These results indicate that the precipitated proteins are indispensable as a nutritive factor for the growth of lactic acid bacteria. This is a new and quite surprising finding.

When the lactic acid bacteria multiply in the culture medium, lactose contained in the culture medium is converted to lactic acid and, hence, the pH of the medium might be lowered to such an extent that the multiplication of the lactic acid bacteria is inhibited. Therefore, the culturing was continued by neutralizing the culture medium every 24 hours by means of addition of powdered calcium hydroxide, until all the lactose contained in the medium had been converted into lactic acid.

The neutralization procedure was conducted in the same manner as in Example 1, except that powdered calcium hydroxide was used in place of the mixed alkaline solution.

The use of calcium hydroxide can be advantageous in that a powder having a reduced hygroscopicity can be obtained from Seasoning Liquid B by processing the cultured medium in the same manner as in Example 1 to produce Seasoning Liquid B and then drying it to a powder.

The culturing, conducted in the above manner, required 5 days (first step).

After completion of the culturing, the pH of the cultured solution was adjusted to 5.8 by adding calcium hydroxide. The total amount of powdered calcium hydroxide added thereto up to this treatment was 280 g.

During the culturing, a substantial amount of water was lost through the evaporation, so that the volume of the solution decreased to 30 liters by the end of the culturing.

The lactic acid bacteria contained in the cultured solution were killed by heating the solution in an autoclave at a temperature of 110° C. for a period of 10 minutes. The solution was then subjected to centrifugation and separated into precipitate and supernatent: the weight of the former was 800 g (dried weight) and the weight of the latter as 3,400 g (second step).

An amino acid solution was prepared by decomposing the precipitate with hydrochloric acid in the same manner as in Example 1.

The hydrochloric acid contained in the amino acid solution was removed by vacuum evaporation and the pH of the condensed product was adjusted to 5.8 by the addition of sodium hydroxide. The resulting solution was decolored with active carbon and then spray dried to give a white powder (Seasoning Powder A).

The thus obtained Seasoning Powder A can be termed hydrolysed animal protein (HAB) since it is derived from animal proteins.

The supernatant obtained in the second step was condensed by means of vacuum evaporation to about ⅓ of its original volume and then spray-dried into a powder (Seasoning Powder B). The powder has a pleasant hue of light amber.

Seasoning Powder B contained 62.0% by weight of calcium lactate.

Finally, 32.0% by weight Seasoning Powder A (HAP), 37.3% by weight Seasoning Powder B, 12.0% by weight commercially available powdered yeast extract, 2.7% by weight powdered sodium 5'-inosinate and 16.0% by weight dextrin were admixed to give a tasty seasoning (third step).

A 0.7% by weight solution of this seasoning was prepared and the taste of the solution was compared with a 2.1% solution of an imported high class beef extract (paste). All the taste judges (20 persons) pointed out that the quality and strength of the taste of the seasoning are quite similar to those of the solution of imported beef extract.

Obviously, numerous modifications and variations of the present invention are possible in light of the above teaching. It is therefore to be understood that within the scope of the appended claims, the invention may be practiced otherwise than as specifically described herein.

What is claimed as new and desired to be secured by the Letters Patent of the United States is:

1. A method for producing a seasoning from whey, comprising the steps of:
(i) preparing a culture medium by adding lactic acid bacteria and bacteria multiplication factors in an amount sufficient to enable the growth of said bacteria to lactose-containing whey;
(ii) fermenting said culture medium in the presence of alkali hydroxides in an amount and for a period of time such that the lactose contained in said medium is converted into alkali salts of lactic acid to result in a fermented solution;
(iii) separating said fermented solution to produce a precipitate phase comprising proteins and a supernatent phase comprising alkali salts of lactic acid;
(iv) adding to said precipitate phase a member selected from the group consisting of mineral acids and proteolytic enzymes, wherein the amount of said mineral acid and proteolytic enzyme is sufficient to decompose said precipitate phase, thereby forming a treated precipitate phase and heating said treated precipitate phase at a temperature and for a period of time sufficient to decompose said precipitate phase into amino acids and peptides;
(v) neutralizing said heat treated precipitate phase and said supernatent phase; and
(vi) admixing said supernatent phase and said treated precipitate phase in amounts sufficient to produce said whey seasoning.

2. The method of claim 1, wherein said multiplication factors are selected from the group consisting of vitamins, yeast extracts, lactulose, skim milk, and L-cysteine hydrochloride.

3. The method of claim 1, wherein said mineral acid is hydrochloric acid.

4. The method of claim 1, further comprising: concentrating said precipitate phase and said supernatant phase prior to said admixing step.

5. The method of claim 1, wherein said neutralizing step is conducted after said admixing step.

6. A method for producing a seasoning from whey, comprising the steps of:
(i) preparing a culture medium by adding lactic acid bacteria and bacteria multiplication factors in an amount sufficient to enable the growth of said bacteria to lactose containing whey;
(ii) adjusting the pH of said medium to about 6–7 and heating said pH adjusting medium;
(iii) fermenting said heated medium at 30°–50° C. for a sufficient period of time and adjusting the pH of said heated medium to about 6–7 by adding an amount of an alkali hydroxide such that the lactose contained in said heated medium is converted into alkali salts of lactic acid to result in a fermented solution;
(iv) centrifuging said fermented solution to produce a precipitate phase comprising proteins and a supernatent phase comprising alkali salts of lactic acid;
(v) adding to said precipitate phase a member selected from the group consisting of mineral acids and proteolytic enzymes, wherein the amount of said mineral acid and proteolytic enzyme is sufficient to decompose said precipitate phase, thereby forming a treated precipitate phase and heating said treated precipitate phase at a temperature and for a period of time sufficient to decompose said precipitate phase into amino acids and peptides;
(iv) neutralizing said heat treated precipitate phase;
(vii) neutralizing said supernatent phase; and
(viii) admixing said neutralized treated precipitate phase and said neutralized supernatent phase at a solids ratio of from 5:95 to 95:5.

7. The method of claim 6, wherein said centrifuging step is conducted with heating.

8. The method of claim 6, wherein said solid ratio is selected from the group consisting of 15:1, 5:1 and 0.5:1.

9. A method for producing a seasoning from whey, comprising the steps of:
(i) preparing a culture medium by adding lactic acid bacteria and bacteria multiplication factors in an amount sufficient to enable the growth of said bacteria to lactose-containing whey;

(ii) fermenting said culture medium in the presence of alkali hydroxides in an amount and for a period of time such that the lactose contained in said heated medium is converted into alkali salts of lactic acid to result in a fermented solution;

(iii) separating said fermented solution to produce a precipitate phase comprising proteins and a supernatent phase comprising alkali salts of lactic acid;

(iv) adding to said precipitate phase a member selected from the group consisting of mineral acids and proteolytic enzymes, wherein the amount of said mineral acid and proteolytic enzyme is sufficient to decompose said precipitate phase, thereby forming a treated precipitate phase and heating said treated precipitate phase at a temperature and for a period of time sufficient to decompose said precipitate phase into amino acids and peptides;

(v) neutralizing said heat treated precipitate phase;

(vi) drying said treated precipitate phase and said supernatent phase; and (vii) admixing said dried phases in amounts sufficient to produce said whey seasoning.

10. The method of claim 9, further comprising:
adding powdered sodium 5'-inosinate, powder yeast extract and dextrin to said admixed phases.

* * * * *